United States Patent [19]

Sugiyama et al.

[11] Patent Number: 4,574,751

[45] Date of Patent: Mar. 11, 1986

[54] INLET PORT FOR INTERNAL COMBUSTION ENGINE

[75] Inventors: Katsuhiko Sugiyama; Hiromitsu Kawazoe; Yoshinori Idota, all of Aichi, Japan

[73] Assignee: Kabushiki Kaisha Toyota Chuo Kenkyusho, Japan

[21] Appl. No.: 638,616

[22] Filed: Aug. 7, 1984

[30] Foreign Application Priority Data

Aug. 19, 1983 [JP] Japan ................................ 58-151874
Nov. 4, 1983 [JP] Japan ................................ 58-207964

[51] Int. Cl.[4] .............................................. F01L 3/00
[52] U.S. Cl. ............................. 123/188 M; 123/52 M; 123/306
[58] Field of Search ................. 123/188 M, 306, 52 M

[56] References Cited

U.S. PATENT DOCUMENTS

| 2,920,613 | 1/1960 | Vogel et al. | 123/188 M |
| 3,020,896 | 2/1962 | Meurer et al. | 123/188 M |
| 4,286,554 | 9/1981 | Okamoto | 123/188 M |
| 4,303,046 | 12/1981 | Nakanishi et al. | 123/188 M |
| 4,312,309 | 1/1982 | Nakanishi et al. | 123/188 M |

FOREIGN PATENT DOCUMENTS

| 46001 | 3/1980 | Japan | 123/188 M |
| 46002 | 3/1980 | Japan | 123/188 M |
| 46004 | 3/1980 | Japan | 123/188 M |

*Primary Examiner*—Ira S. Lazarus
*Attorney, Agent, or Firm*—Mason, Fenwick & Lawrence

[57] ABSTRACT

An inlet port for an internal combustion engine has an inlet port opened on an end face of a cylinder chamber at an off-center position, and the inlet hole is provided with an inlet valve and connected to an inlet passage. The inlet passage comprises a swirl generating section and an introducing section, and width between the peripheral surface of the valve stem of the inlet valve and the wall surface of the swirl generating section is made larger at the outside part on the wall side of the cylinder chamber than at the inside part on the center side of the cylinder chamber. The introducing section is connected to the outside part of the swirl generating section. In the plane intersecting perpendicularly to the center line of the introducing section within the parallel plane to the opening face of the inlet hole, the width of the outside part of the swirl generating section is set between 1.1 times and 2.8 times of the width of the inside part. The height from the opening face of the inlet hole to a ceiling of the swirl generating section is made to decrease from the outside part to the inlet part around the valve stem, and rate of reduction is set between 0% and 0.18% of the inlet hole diameter per one degree around the valve stem.

7 Claims, 10 Drawing Figures

4,574,751

INLET PORT FOR INTERNAL COMBUSTION ENGINE

BACKGROUND OF THE INVENTION

This invention relates to an inlet port for an internal combustion engine which has an inlet hole opened on the end face of a cylinder chamber at an off-center position, the inlet hole being provided with an inlet valve and connected to an inlet passage.

The inventors of the present invention already invented an inlet port for an internal combustion engine, as disclosed in U.S. patent application Ser. No. 531,391, wherein in order to generate a suitable level of stable swirl without reducing the volume efficiency, the inlet passage comprises a swirl generating section which is connected to the inlet hole and surrounds the inlet valve at the end section of the inlet passage and an introducing section which is the remaining section of the inlet passage excluding the end section, the width between the peripheral surface of the valve stem of the inlet valve and the wall surface of the swirl generating section is made larger at the outside part on the wall side of the cylinder chamber than at the inside part on the center side of the cylinder chamber, the introducing section is connected to the wider outside part of the swirl generating section, the height from the opening face of the inlet hole to the ceiling of the swirl generating section is constant or made to decrease from the wider outside part to the narrower inside part around the valve stem, and the average rate of reduction is set to not more than 0.18% of the inlet hole diameter per one degree around the valve stem. The prior invention can attain its aim intended, however, the strong swirl can not always be generated under the high volume efficiency.

SUMMARY OF THE INVENTION

An object of the invention is to provide an inlet port for an internal combustion engine, by improving the prior invention, which can generate the strong swirl under high volume efficiency.

The present invention is directed to the limitation of a part of the prior invention based on experimental results in order to achieve the above object.

That is to say, the present invention relates to an inlet port for an internal combustion engine as an improvement of the prior invention, wherein, in the plane which intersects perpendicularly to the center line of the introducing section within the parallel plane to the opening face of the inlet hole, the width of the outside part of the swirl generating section is set to not less than 1.1 times and not more than 2.8 times, preferably not less than 1.15 times and not more than 2.0 times, as large as the width of the inside part.

The inlet port can generate the strong swirl under the high volume efficiency, as afterward shown clearly by the experimental results.

Further in the inlet port of the present invention as above described, the center axis of the cylinder surface constituting the wall surface of the outside part of the swirl generating section is off-centered to the side of the wall surface of the outside part from the center axis of the inlet hole and the off-center distance is set to not less than 2% and not more than 50%, preferably not less than 3% and not more than 30%, of the diameter of the inlet hole, and the connecting angle between the outside part and the introducing section is set to an angle so that the main inlet stream from the introducing section to the outside part flows in between the wall surface of the outside part and the peripheral surface of the valve stem.

Further in the inlet port of the present invention as above described, the distance from the center axis of the inlet hole to the center line of the introducing section is set to not less than 20% and not more than 60% of the diameter of the inlet hole, and/or the minimum width of the tapered introducing section is set to not less than 25% and not more than 85% of the diameter of the inlet hole. The inlet port can generate the strong swirl under the high volume efficiency as afterward shown clearly by the experimental results.

DETAILED DESCRIPTION OF THE PREFERRED EMBODIMENTS

First Embodiment (FIGS. 1 through 4)

Figure 1:
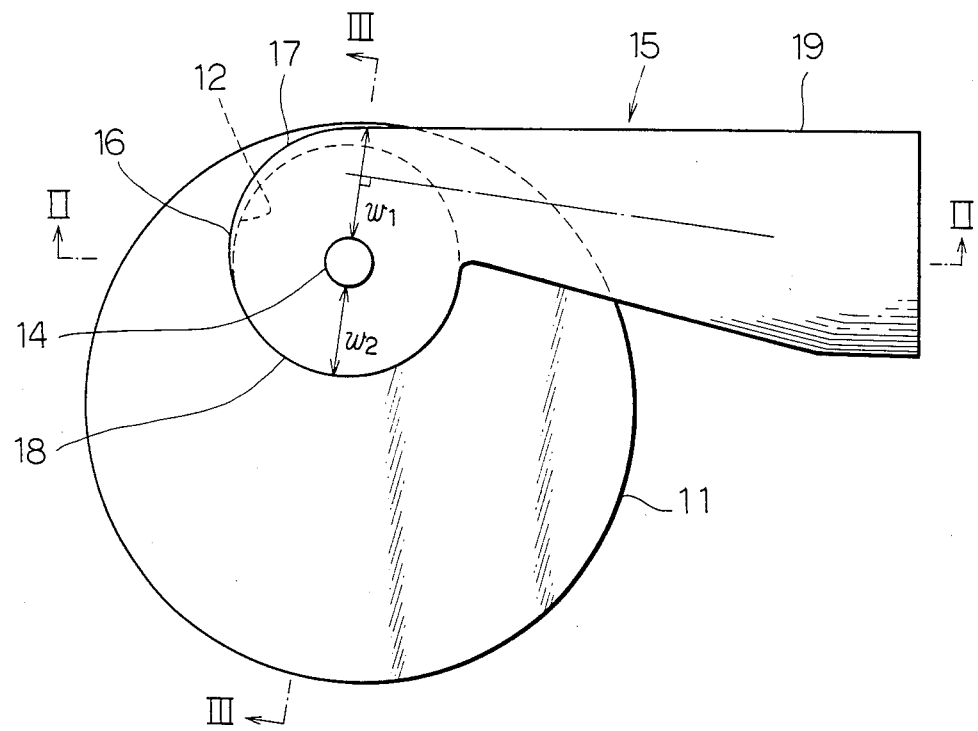
FIG. 1 is a plan view of an inlet port of the first embodiment of the present invention.
Figure 2:
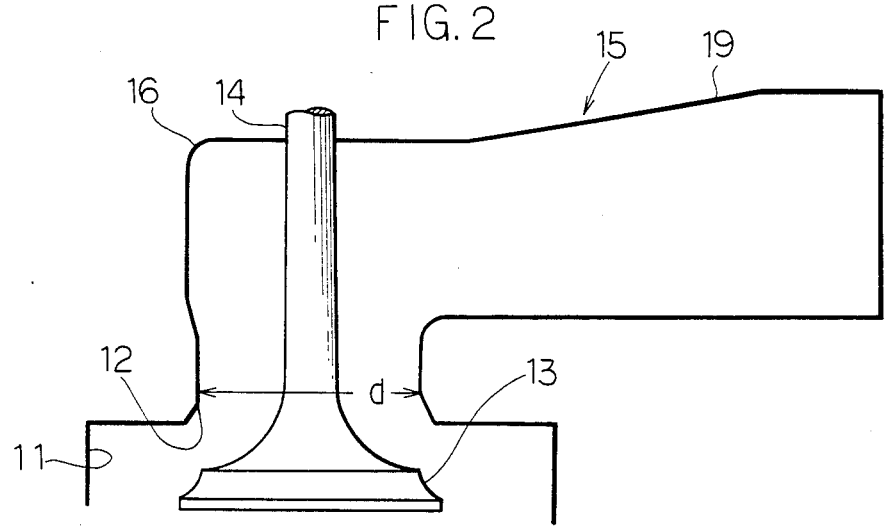
FIG. 2 is a sectional view along line II—II of FIG. 1.
Figure 3:
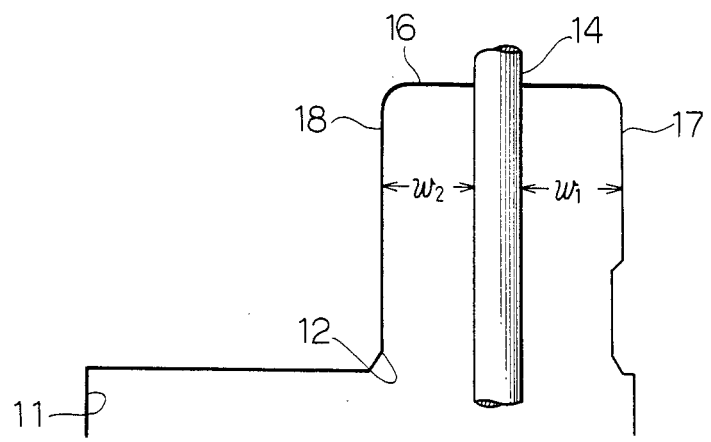
FIG. 3 is a sectional view along line III—III of FIG. 1.

An inlet port for an internal combustion engine in the first embodiment, as shown in FIGS. 1 through 3, has a circular inlet hole 12 opened on a circular end face of a cylinder chamber 11 at an off-center position from its center towards the wall side. The inlet hole 12 is provided with an inlet valve 13 of poppet valve type and connected to an inlet passage 15. The inlet passage 15 comprises a swirl generating section 16 which is connected to the inlet hole 12 and surrounds the inlet valve 13 at the end section of the inlet passage and an introducing section 19 which is the remaining section of the inlet passage excluding the end section. The wall surface of the swirl generating section 16 is formed by smoothly connecting two cylindrical surfaces facing to the peripheral surface of the valve stem 14. The width between the peripheral surface of the valve stem 14 and the wall surface of the swirl generating section 16 is wider at the outside part 17 on the wall side of the cylinder chamber 11 than at the inside part 18 on the center side of the cylinder chamber 11. The width is decreased gradually from the outside part 17 to the inside part 18 around the valve stem 14. The introducing section 19 is connected to the wider outside part 17 of the swirl generating section 16 along its tangential direction. The height from the opening face of the inlet hole 12 to the ceiling of the swirl generating section 16 is constant or made to decrease gradually from the wider outside part 17 to the narrower inside part 18 around the valve stem 14, and its average rate of reduction is set to not more than 0.18% of the diameter, d, of the inlet hole 12 per one degree around the valve stem 14. In the plane which intersects perpendicularly to the center line of the introducing section 19 within the parallel plane to the opening face of the inlet hole 12 and includes the center axis of the valve stem 14, the width, $w_1$, of the outside part 17 of the swirl generating section 16 is set to not less than 1.1 times and not more than 2.8 times as large as the width, $w_2$, of the inside part 18, specifically speaking $w_1 = 17.25$ mm, $w_2 = 14.25$ mm and $w_1/w_2 = 1.21$.

In this inlet port, the inlet air-stream through the inlet passage 15 flows from the introducing section 19 into the swirl generating section 16 and further flows through the inlet hole 12 into the cylinder chamber 11. The main stream of the inlet air flows from the center position of the introducing section 19 into the middle position between the wall surface of the outside part 17 of the swirl generating section 16 and the peripheral surface of the valve stem 14 and further flows through the inlet hole 12 to the cylinder chamber 11 along the tangential direction of the wall surface in the vicinity of the inlet hole 12 so as to produce the swirl circling along the wall surface of the cylinder chamber 11.

Figure 4:
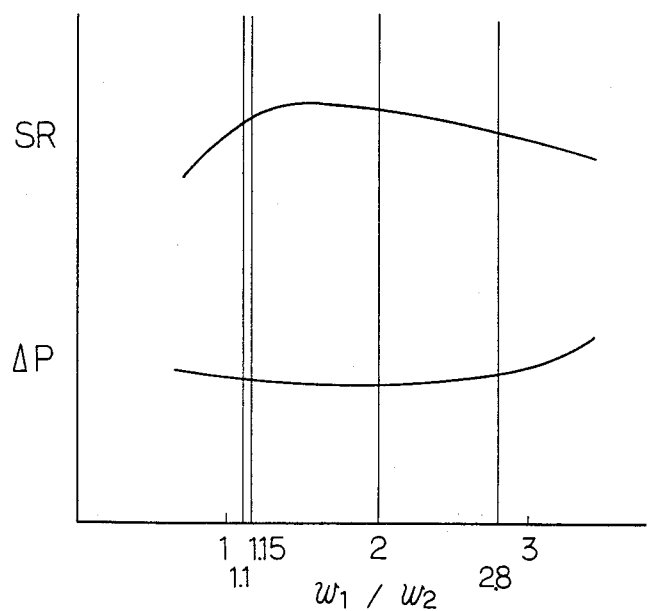
FIG. 4 is a graph indicating the relation between the swirl ratio SR or the pressure loss $\Delta P$ and the width ratio $w_1/w_2$, in regard to the inlet port as shown in FIG. 1.

In the inlet port of this embodiment, the ratio $w_1/w_2$ of the width of the outside part 17 and the inside part 18 was set to various values and then the strength of the swirl generating in the cylinder chamber 11, that is, the swirl ratio SR and the pressure loss $\Delta P$ of the inlet passage 15 were measured for each value of the width ratio $w_1/w_2$. The results are shown in the graph of FIG. 4. As shown in the upper section or lower of the graph, the swirl ratio SR becomes small and the pressure loss $\Delta P$ becomes large when the width ratio $w_1/w_2$ is less than 1.1 or more than 2.8. The swirl ratio SR becomes larger and the pressure loss $\Delta P$ becomes smaller when the width ratio $w_1/w_2$ is not less than 1.1 and not more than 2.8; and the strong swirl is generated under the high volume efficiency. Besides the better performance can be obtined when the width ratio $w_1/w_2$ is not less than 1.15 and not more than 2.0.

Second Embodiment (FIGS. 5 through 10)

Figure 5:
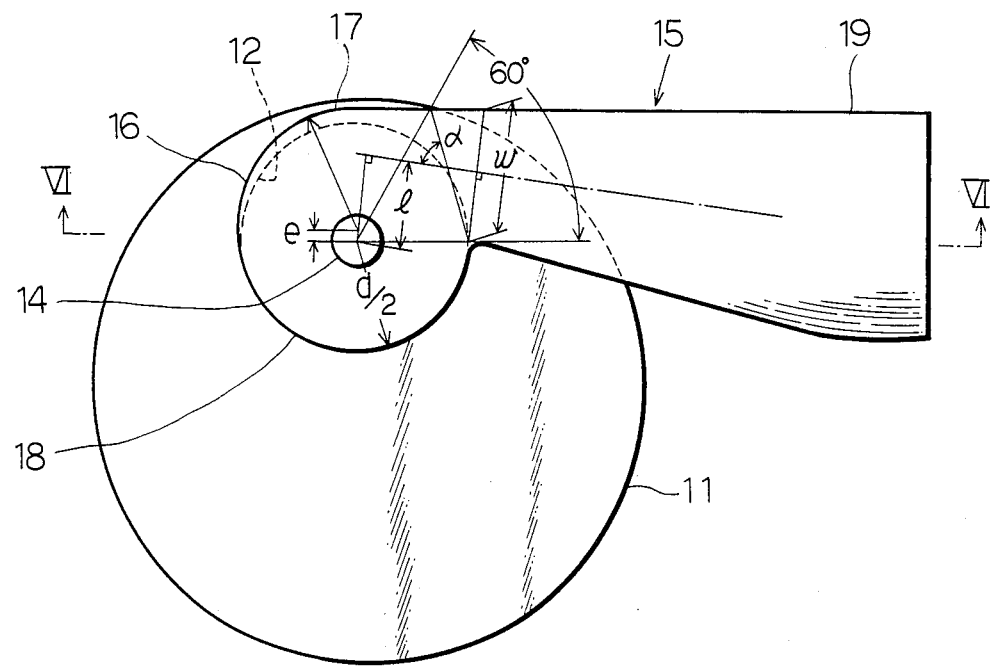
FIG. 5 is a plan view of an inlet port of the second embodiment of the invention.
Figure 6:
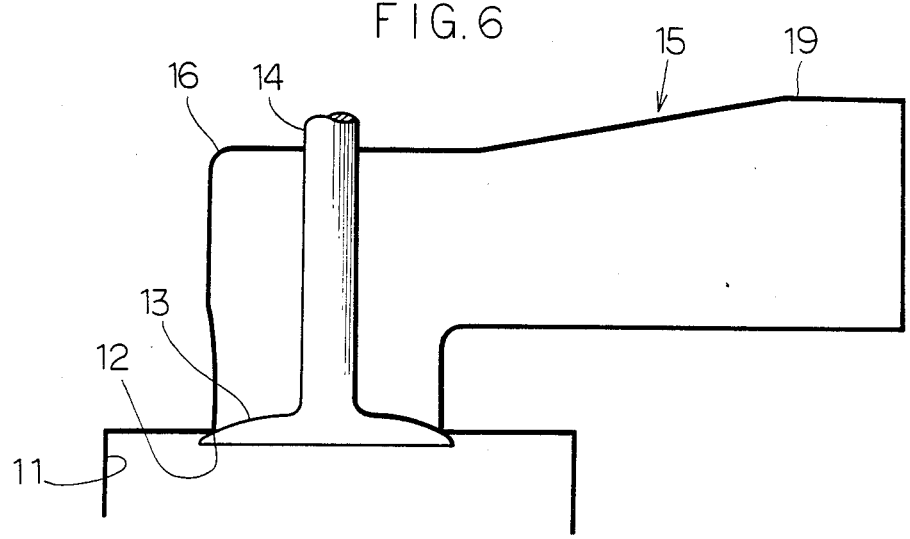
FIG. 6 is a sectional view along line VI—VI of FIG. 5.

An inlet port for an internal combustion engine in the second embodiment, as shown in FIGS. 5 and 6, is composed similarly to that in the first embodiment. Moreover the center axis of the cylinder surface constituting the wall surface of the inside part 18 of the swirl generating section 16 coincides with the center axis of the inlet hole 12, while the center axis of the cylinder surface constituting the wall surface of the outside part 17 is off-centered from the center axis of the inlet hole 12 towards the wall surface of the outside part 17. The distance of the off-center, e, is set to not less than 2% and not more than 50% of the diameter, d, of the inlet hole 12. The connecting angle between the outside part 17 and the introducing section 19 is set to an angle so that the main inlet stream from the introducing section 19 to the outside part 17 flows in between the wall surface of the outside part 17 and the peripheral surface of the valve stem 14 of the inlet valve 13. The distance, l, from the center axis of the inlet hole 12 to the center line of the introducing section 19 is set to not less than 20% and not more than 60% of the diameter, d, of the inlet hole 12. The introducing section 19 which has a rectangular cross section is formed in taper, and the minimum width, w, of the introducing section is set to not less than 25% and not more than 85% of the diameter, d, of the inlet hole 12.

In this inlet port, the inlet air-stream through the inlet passage 15 flows from the introducing section 19 into the swirl generating section 16 and further flows through the inlet hole 12 into the cylinder chamber 11. The main stream of the inlet air flows from the center position of the introducing section 19 into the middle position between the wall surface of the outside part 17 of the swirl generating section 16 and the peripheral surface of the valve stem 14 and further flows through the inlet hole 12 to the cylinder chamber 11 along the tangential direction of the wall surface in the vicinity of the inlet hole 12 so as to produce the swirl circling along the wall surface of the cylinder chamber 11. As a result, the strong swirl is generated under the high volume efficiency.

EXPERIMENT 1

In the inlet port of the embodiment, the off-center distance, e, at which the center axis of the cylinder surface constituting the wall surface of the outside part 17 of the swirl generating section 16 is off-centered from the center axis of the inlet hole 12 towards the wall surface of the outside part 17, is set to various values with respect to the diameter, d, of the inlet hole 12. The strength of the swirl generating in the cylinder 11, that is, the swirl ratio SR and the pressure loss $\Delta P$ of the inlet passage 15 were measured for each value of the off-center distance e. The results are shown by the solid line in the graph of FIG. 7. As is clearly seen from the upper section or lower of the graph, the swirl ratio SR is smaller and the pressure loss $\Delta P$ is larger, when the dimensionless off-center distance e/d is more than 0.5. Meanwhile the swirl ratio SR is smaller and the pressure loss $\Delta P$ is larger as the dimensionless off-center distance e/d is decreasing to less than 0.1. The decreasing rate of the swirl ratio SR and the increasing rate of the pressure loss $\Delta P$ become larger when the dimensionless off-center distance e/d is less than 0.02. Therefore, the swirl ratio SR is large and the pressure loss $\Delta P$ is small, when the dimensionless off-center distance e/d is not less than 0.02 and not more than 0.5; the strong swirl is generated under the high volume efficiency. Beside the better performance is acquired when the dimensionless off-center distance e/d is not less than 0.03 and not more than 0.3.

Figure 7:
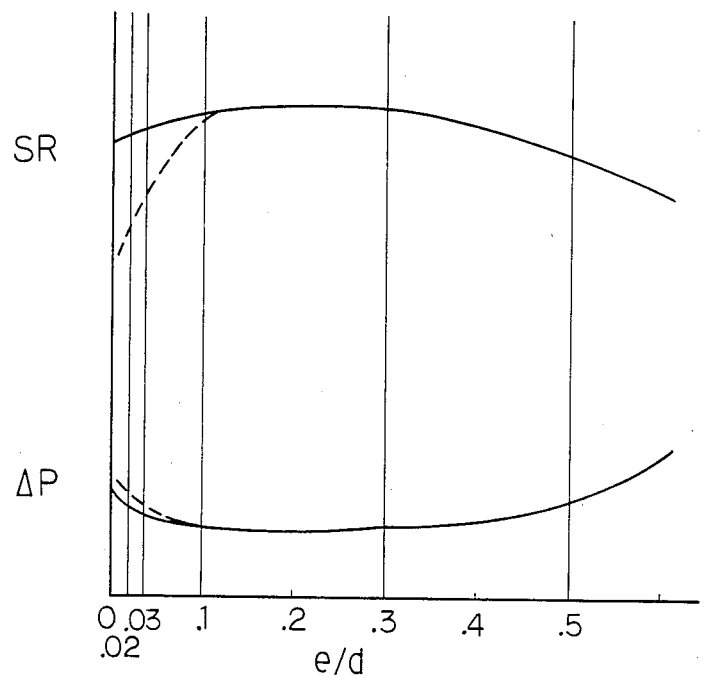
FIG. 7 is a graph indicating the relation between the swirl ratio SR or the pressure loss $\Delta P$ and a dimensionless off-center distance $e/d$, in regard to the inlet port as shown in FIG. 5.

In addition, as shown by the broken line in FIG. 7, the performance gets worse and the swirl ratio SR rapidly decreases and the pressure loss $\Delta P$ increases in the range of the dimensionless off-center e/d being less than 0.1, when the connecting angle between the outside part 17 and the introducing section 19 is set to an angle except the angle at which the main stream of the inlet air, passing from the introducing section 19 to the outside part 17, flows in between the wall surface of the outside part 17 and the peripheral surface of the valve stem 14.

Furthermore, the connecting angle, α, between the outside part 17 and the introducing section 19 is set to various values and the swirl ratio SR and the pressure loss ΔP were measured for each value of the angle Δ. The results are shown in the graph of FIG. 8.

Only, as a matter of convenience, the connecting angle, Δ, is, as shown in FIG. 5, the angle between the center line of the introducing section 19 and the connecting plane which contains both the connecting line of the wall surface of the inside part 18 to the inside wall of the introducing section 19, and the intersection line formed by the wall surface of the outside part 17 or the outside wall of the introducing section 19 and the plane rotating in 60 degrees around the center axis of the inlet hole 12 towards the outside part 17 from the plane containing the connecting line and the center axis of the inlet hole 12.

Figure 8:
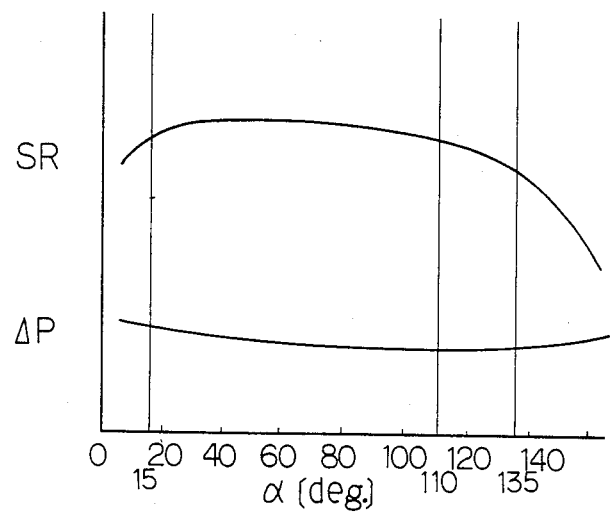
FIG. 8 is a graph indicating the relation between the swirl ratio SR or the pressure loss $\Delta P$ and a connecting angle $\alpha$, in regard to the inlet port as shown in FIG. 5.

As shown in the upper section or the lower of the graph of FIG. 8, the swirl ratio SR is much smaller and the pressure loss ΔP is larger when the connecting angle, Δ, is more than 135°. The swirl gets weaker because the main stream of the inlet air, which flows into the swirl generating section 16 from the introducing section 19, collides against the valve stem 14. Accordingly, the swirl ratio SR is large and the pressure loss ΔP is small when the connecting angle, α, is 135° or less. Besides the better performance is acquired when the connecting angle, α, is 110° or less. On the contrary the swirl ratio SR drastically decreases and the pressure loss ΔP increases when the connecting angle, Δ, is less than 15°; the swirl gets weaker because a part of the main stream of the inlet air, which flows into the outside part 17 of the swirl generating section 16 from the introducing section 19, collides against the wall surface of the outside part 17. Accordingly the swirl ratio SR is large and the pressure loss ΔP is small when the connecting angle, α, is set to the degree at which the main stream of the inlet air from the introducing section 19 to the outside part 17 flows in between the wall surface of the outside part 17 and the peripheral surface of the valve stem 14.

EXPERIMENT 2

Figure 9:
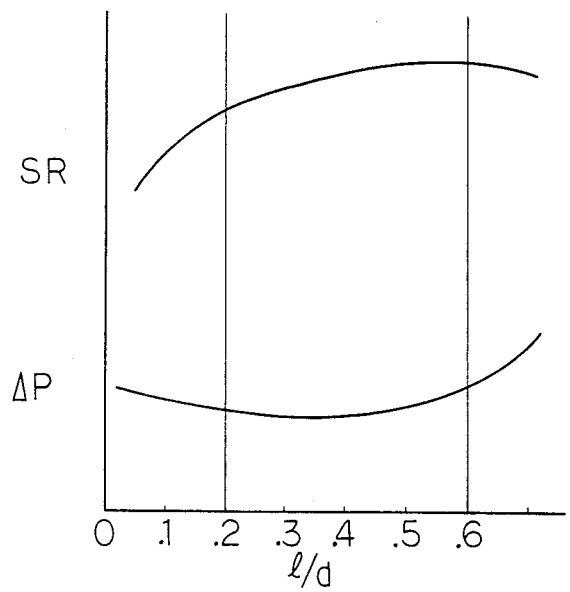
FIG. 9 is a graph indicating the relation between the swirl ratio SR or the pressure loss $\Delta P$ and a dimensionless distance $l/d$, in regard to the inlet port as shown in FIG. 5.

In the inlet port of the embodiment, the distance, l, from the center axis of the inlet hole 12 to the center line of the introducing section 19 is set to various values with respect to the diameter, d, of the inlet hole 12. The swirl ratio SR and the pressure loss ΔP were measured for each value of the distance l. The results are shown in the graph of FIG. 9. As the upper section or the lower of the graph shows, the swirl ratio SR is smaller and the pressure ΔP is larger when the dimensionless distance l/d is more than 0.6 or less than 0.2. Accordingly the swirl ratio SR is larger and the pressure loss ΔP is smaller when the dimensionless distance l/d is not less than 0.2 and not more than 0.6.

Figure 10:
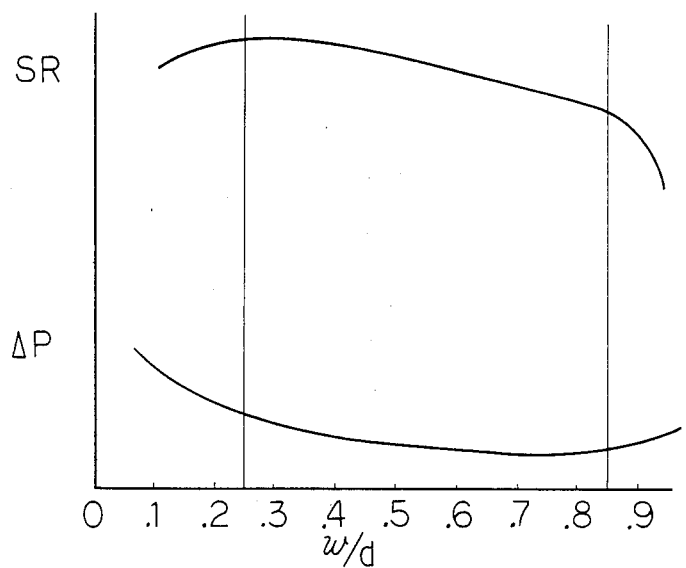
FIG. 10 is a graph indicating the relation between the swirl ratio SR or the pressure loss $\Delta P$ and a dimensionless minimum width $w/d$, in regard to the inlet port as shown in FIG. 5.

The minimum width, w, of the introducing section 19 formed in taper is set to various values with respect to the diameter, d, of the inlet hole 12. The swirl ratio SR and the pressure loss ΔP were measured for each value of the minimum width w. The results are shown in the graph of FIG. 10. As the upper section or the lower of the graph shows, the swirl ratio SR is smaller and the pressure loss ΔP is larger when the dimensionless minimum width w/d is more than 0.85 or less than 0.25. Accordingly, the swirl ratio SR is larger and the pressure loss ΔP is smaller when the minimum width w/d is not less than 0.25 and not more than 0.85.

What we claim is:

1. An internal combustion engine comprising:
a cylinder chamber having an end face;
an inlet hole in said end face having a center axis in off-center relation to said cylinder chamber;
a non-helical inlet valve positioned in said inlet hole and having a valve stem having a peripheral surface;
an inlet passage comprising a swirl generating section which has a ceiling and is connected to said inlet hole and surrounds said inlet valve at an end section thereof and an introducing section having a center line and comprising the remaining portion of said inlet passage;
a first distance between the peripheral surface of said valve stem of said inlet valve and the wall surface of said swirl generating section as measured in a plane perpendicular to said center line of said introducing section and a plane parallel to the inlet hole and the outside part on the wall side of said cylinder chamber being larger than a second distance measured in the same planes at the inside part on the center side of said cylinder chamber;
said introducing section being connected to the outside part of the swirl generating section;
wherein the ratio of the first distance to the second distance is not less than 1.1 or more than 2.8;
wherein the height from the inlet hole to said ceiling of the swirl generating section is greatest at the wider outside part and progressively decreases from the wider outside part to the narrower inside part around the valve stem; and
wherein the average rate of reduction of said height is not less than 0% and not more than 0.18% of the inlet hole diameter for each degree around the valve stem.

2. An internal combustion engine as recited in claim 1, wherein the ratio of said first distance to said second distance is not less than 1.15 or more than 2.0.

3. An internal combustion engine as recited in claim 1, wherein the center axis of a cylindrical surface constituting the wall surface of the outside part is off-centered from the center axis of the inlet hole towards the wall surface of the outside part and the off-center distance is not less than 2% and not more that 50% of the diameter of the inlet hole, and the connecting angle between the outside part and the introducing section is such that a main inlet stream flow from the introducing section to the outside part flows between the wall surface of the outside part and the peripheral surface of the valve stem.

4. An internal combustion engine as set forth in claim 3, wherein said off-center distance is not less than 3% and not more than 30% of the diameter of the inlet hole.

5. An internal combustion engine as set forth in claim 3, wherein the distance from the center axis of the inlet hole to the center line of the introducing section is not less than 20% and not more than 60% of the diameter of the inlet hole.

6. An internal combustion engine as set forth in claim 3, wherein the introducing section is tapered towards the swirl generating section, and the minimum width at the tapered portion is not less than 25% and not more than 85% of the diameter of the inlet hole.

7. An internal combustion engine as set forth in claim 5, wherein the introducing section is tapered towards the swirl generating section, and the minimum width at the tapered portion is not less than 25% and not more than 85% of the diameter of the inlet hole.

* * * * *